United States Patent
Chow et al.

(10) Patent No.: US 10,814,596 B2
(45) Date of Patent: Oct. 27, 2020

(54) SILAGE FILM, WRAPPED FODDER, AND STORAGE METHOD OF FODDER

(71) Applicant: KURARAY CO., LTD., Kurashiki-shi (JP)

(72) Inventors: Edgard Chow, Houston, TX (US); Wataru Hirose, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 29 days.

(21) Appl. No.: 15/529,562

(22) PCT Filed: Nov. 25, 2015

(86) PCT No.: PCT/JP2015/083058
§ 371 (c)(1),
(2) Date: May 25, 2017

(87) PCT Pub. No.: WO2016/084840
PCT Pub. Date: Jun. 2, 2016

(65) Prior Publication Data
US 2017/0326852 A1 Nov. 16, 2017

Related U.S. Application Data

(60) Provisional application No. 62/085,445, filed on Nov. 28, 2014.

(51) Int. Cl.
| | |
|---|---|
| C08J 5/18 | (2006.01) |
| B32B 27/30 | (2006.01) |
| B32B 27/28 | (2006.01) |
| A01F 25/13 | (2006.01) |
| B32B 27/00 | (2006.01) |
| B32B 27/40 | (2006.01) |
| B32B 27/32 | (2006.01) |
| B32B 27/08 | (2006.01) |
| B32B 27/34 | (2006.01) |
| B32B 27/36 | (2006.01) |
| B32B 27/22 | (2006.01) |
| B32B 7/12 | (2006.01) |
| B32B 27/26 | (2006.01) |

(Continued)

(52) U.S. Cl.
CPC ............ *B32B 27/306* (2013.01); *A01F 25/13* (2013.01); *B32B 7/12* (2013.01); *B32B 27/00* (2013.01); *B32B 27/08* (2013.01); *B32B 27/22* (2013.01); *B32B 27/26* (2013.01); *B32B 27/28* (2013.01); *B32B 27/288* (2013.01); *B32B 27/302* (2013.01); *B32B 27/308* (2013.01); *B32B 27/32* (2013.01); *B32B 27/322* (2013.01); *B32B 27/325* (2013.01); *B32B 27/34* (2013.01); *B32B 27/36* (2013.01); *B32B 27/40* (2013.01); *B65D 65/02* (2013.01); *C08J 5/18* (2013.01); *A01F 2015/0745* (2013.01); *B32B 2250/05* (2013.01); *B32B 2250/246* (2013.01); *B32B 2250/40* (2013.01); *B32B 2250/42* (2013.01); *B32B 2274/00* (2013.01); *B32B 2307/4026* (2013.01); *B32B 2307/54* (2013.01); *B32B 2307/546* (2013.01); *B32B 2307/71* (2013.01); *B32B 2307/7163* (2013.01); *B32B 2307/7244* (2013.01); *B32B 2307/73* (2013.01); *B32B 2307/732* (2013.01); *B32B 2410/00* (2013.01); *B32B 2553/00* (2013.01); *C08J 2323/08* (2013.01)

(58) Field of Classification Search
CPC .......... C08K 5/05; C08K 5/053; B32B 27/28; B32B 27/306; C08L 29/04
See application file for complete search history.

(56) References Cited

U.S. PATENT DOCUMENTS 5,412,005 A * 5/1995 Bastioli ................. A61L 15/225
524/47
6,472,470 B1 * 10/2002 Fujiwara ................... C08F 8/12
524/557

(Continued)

FOREIGN PATENT DOCUMENTS

| CN | 1337421 A | 2/2002 |
| CN | 1746220 | 3/2006 |

(Continued)

OTHER PUBLICATIONS

Matsuda, N., et al.; Polymer Degradation and Stability, 2003, vol. 79, p. 13-20.*

(Continued)

*Primary Examiner* — Robert S Jones
(74) *Attorney, Agent, or Firm* — Oblon, McClelland, Maier & Neustadt, L.L.P.

(57) ABSTRACT

A silage film having at least one layer of a resin composition containing an ethylene-vinyl alcohol copolymer (A) and a hydroxy group-containing compound (B). In the resin composition containing the ethylene-vinyl alcohol copolymer (A) and the hydroxy group-containing compound (B), the hydroxy group-containing compound (B) has a molecular weight of less than or equal to 200, a ratio of number of hydroxy groups per molecule to the molecular weight ranging from 0.02 to 0.03, and a melting point of greater than or equal to 23° C., and a content of the hydroxy group-containing compound (B) in the resin composition ranging from 3% to 15% by mass. The silage film has excellent oxygen barrier property and stretchability (suitability for wrapping) and can be suitably used for long-term storage of silage.

19 Claims, No Drawings

(51) Int. Cl.
B65D 65/02 (2006.01)
A01F 15/07 (2006.01)

(56) References Cited

U.S. PATENT DOCUMENTS

| | | | | |
|---|---|---|---|---|
| 6,608,121 | B2* | 8/2003 | Isozaki | C08K 5/04 |
| | | | | 524/385 |
| 6,686,405 | B1* | 2/2004 | Kawahara | B29C 48/762 |
| | | | | 524/127 |
| 2003/0157354 | A1 | 8/2003 | Van Veghel et al. | |
| 2004/0053063 | A1 | 3/2004 | Porter et al. | |
| 2006/0058439 | A1 | 3/2006 | Keller | |
| 2009/0312462 | A1* | 12/2009 | Oakley | C08L 3/02 |
| | | | | 524/47 |
| 2014/0205821 | A1* | 7/2014 | Walther | C08L 29/04 |
| | | | | 428/216 |
| 2014/0290185 | A1* | 10/2014 | Forzano | A01F 25/14 |
| | | | | 53/461 |
| 2017/0044350 | A1 | 2/2017 | Chow et al. | |

FOREIGN PATENT DOCUMENTS

| | | |
|---|---|---|
| CN | 1761704 | 4/2006 |
| CN | 101323685 | 12/2008 |
| EP | 3 135 724 A1 | 3/2017 |
| IT | GE20110121 A1 * | 4/2013 |
| JP | 62-85942 | 4/1987 |
| JP | 62-85942 A | 4/1987 |
| JP | 8-151469 A | 6/1996 |
| JP | 10-1571 A | 1/1998 |
| JP | 2000-119470 A | 4/2000 |
| JP | 2001-288321 A | 10/2001 |
| JP | 2003-276123 A | 9/2003 |
| JP | 2003-277566 A | 10/2003 |
| JP | 2009-533538 A | 9/2009 |
| JP | 2011-46929 A | 3/2011 |
| JP | 2014-172928 A | 9/2014 |
| WO | WO2004/074351 | 9/2004 |
| WO | 2007/118280 A1 | 10/2007 |
| WO | WO 2015/163437 A1 | 10/2015 |

OTHER PUBLICATIONS

International Search Report dated Feb. 16, 2016, in PCT/JP2015/083058, filed Nov. 25, 2015.

Extended Search Report dated Jun. 15, 2018 in European Patent Application No. 15862751.3, citing documents AO and AP therein, 7 pages.

Decision to Grant Patent dated Feb. 13, 2018 in Japanese Patent Application No. 2016-561909 (with English translation), citing documents AO, AP and AQ therein, 6 pages.

Office Action dated Jun. 7, 2019 in Australian Patent Application No. 2015351457, citing document AO therein, 3 pages.

Office Action dated Oct. 9, 2019 in Chinese Patent Application No. 201580064567.8 with English translation citing document AO therein, 11 pages.

Office Action in corresponding Chinese Application No. 201580064567.8, dated Jul. 21, 2020. (w/English Translation).

* cited by examiner

SILAGE FILM, WRAPPED FODDER, AND STORAGE METHOD OF FODDER

TECHNICAL FIELD

The present invention relates to a silage film that has at least one layer of a resin composition comprising an ethylene-vinyl alcohol copolymer (A) and a hydroxy group-containing compound (B). The silage film has excellent oxygen barrier property and stretchability (suitability for wrapping). The present invention also relates to wrapped fodder comprising the silage film of the present invention as well as a storage method of fodder using the wrapped fodder.

BACKGROUND ART

Silage means a harvested fodder crop stored in a silo for lactic acid fermentation. The fermentation generates substances such as lactic acid and acetic acid, which suppress activity of putrefactive bacteria and proteolytic bacteria, resulting in long-term storage of fodder. Organic acids generated by the fermentation become an important nutrition for livestock.

A wrap silo using a silage film, is widely used to prepare silage, for storing grass. A wrap silo is a method to control the silage quality by and hermetically sealed wrapping and sealing grass with a silage film.

To ensure good quality of the prepared wrap silage, the interior of the wrap should be oxygen free. Good quality of silage is mainly attributed to lactic acid fermentation. Since lactobacilli are anaerobic, it is important that no oxygen is present in the wrap silo for their enhanced activity.

Typical silage films, which are mainly made of polyethylene, have insufficient oxygen barrier properties and therefore may allow oxygen penetration into a wrap silo during long-term storage, leading to silage decomposition. In this case, the silage is no longer usable as a fodder for livestock. Japanese Patent Laying-Open No. 2003-276123 (PTD 1) suggests a silage film having excellent gas barrier properties produced by using a polyamide resin. Japanese Patent Laying-Open No. 2014-172928 (PTD 2) suggests a silage film having excellent gas barrier properties produced by using an ethylene-vinyl alcohol copolymer.

CITATION LIST

Patent Document

PTD 1: Japanese Patent Laying-Open No. 2003-276123
PTD 2: Japanese Patent Laying-Open No. 2014-172928

SUMMARY OF INVENTION

Technical Problems

However, a silage film produced by using a polyamide resin as in PTD 1 has insufficient oxygen barrier property and therefore the resulting silage has insufficient long-term storage stability. A silage film produced by using an ethylene-vinyl alcohol copolymer as in PTD 2 has sufficient oxygen barrier property and therefore has no problem in long-term storage stability of the resulting silage, but it sometimes breaks when the film is wrapped around grass by a wrapping machine.

The present invention has been developed to solve these problems. An object of the present invention is to provide a silage film having excellent oxygen barrier property and stretchability (suitability for wrapping).

Solutions to Problems

The present invention provides a silage film having:

at least one layer of a resin composition comprising an ethylene-vinyl alcohol copolymer (A) and a hydroxy group-containing compound (B), wherein the hydroxy group-containing compound (B) has a molecular weight of less than or equal to 200, a ratio of number of hydroxy groups per molecule to the molecular weight ranges from 0.02 to 0.03, and a melting point of greater than or equal to 23° C., and the content of the hydroxy group-containing compound (B) in the resin composition ranges from 3% to 15% by mass.

In the silage film of the present invention, the melting point of the hydroxy group-containing compound (B) preferably ranges from 23° C. to 200° C.

In the silage film of the present invention, the hydroxy group-containing compound (B) has a ratio of number of hydroxy groups per molecule to the molecular weight preferably ranging from 0.022 to 0.025.

In the silage film of the present invention, the hydroxy group-containing compound (B) is preferably 1,1,1-trimethylolpropane.

In the silage film of the present invention, the content of the hydroxy group-containing compound (B) in the resin composition preferably ranges from 5% to 10% by mass.

In the silage film of the present invention, the ethylene unit rate of the ethylene-vinyl alcohol copolymer (A) is preferably ranging from 20 mol % to 60 mol %.

In the silage film of the present invention, it is preferable that the total layer thickness of the silage film ranges from 5 μm to 200 μm and the thickness ratio of the layer of the resin composition in the total layer thickness ranges from 1% to 20%.

The silage film of the present invention preferably has a polyolefin resin layer on at least one side of the layer of the resin composition.

In the silage film of the present invention, the layer of the resin composition is preferably an intermediate layer.

The present invention also provides wrapped fodder comprising the silage film of the present invention.

The present invention further provides a storage method of fodder using the wrapped fodder of the present invention.

Advantageous Effects of Invention

The present invention can provide a silage film having excellent oxygen barrier property and stretchability (suitability for wrapping). The present invention also provides wrapped fodder comprising the silage film of the present invention as well as a storage method of fodder using the wrapped fodder.

DESCRIPTION OF EMBODIMENTS

<Resin Composition>

A silage film of the present invention has at least one layer (resin composition layer) of a resin composition comprising an ethylene-vinyl alcohol copolymer (A) and a hydroxy group-containing compound (B).

(Ethylene-Vinyl Alcohol Copolymer (A))

The resin composition comprising an ethylene-vinyl alcohol copolymer (A) and a hydroxy group-containing compound (B) in the silage film of the present invention contains the ethylene-vinyl alcohol copolymer (EVOH) (A) as a main component, which is a copolymer primarily composed of an ethylene unit and a vinyl alcohol unit. The EVOH (A) can be obtained by saponification of a copolymer of ethylene and vinyl ester with the use of an alkaline catalyst or the like, for example. Typical examples of the vinyl ester include vinyl acetate, and other fatty acid vinyl esters (such as vinyl propionate and vinyl pivalate) can also be used.

The EVOH (A) can contain an additional comonomer copolymerized thereto, such as propylene, butylene, an unsaturated carboxylic acid or an ester thereof, a vinylsilane compound, and N-vinylpyrrolidone, provided that the objects of the present invention are not impaired.

The lower limit of ethylene unit rate in the EVOH (A) is preferably 20 mol %, more preferably 25 mol %, particularly preferably 40 mol %. The upper limit of ethylene unit rate in the EVOH (A) is preferably 60 mol %, more preferably 55 mol %, particularly preferably 50 mol %. When the ethylene unit rate is less than 20 mol %, the resin composition is poor in melt moldability and an excellent silage film may not be obtained. When the ethylene unit rate is greater than 60 mol %, the oxygen barrier property of the resulting silage film may be poor, and the long-term storage stability of silage may be insufficient.

From the viewpoint of maintaining oxygen barrier property of the resulting silage film, the saponification degree of the EVOH (A) is preferably greater than or equal to 90 mol %, more preferably greater than or equal to 95 mol %, particularly preferably greater than or equal to 99 mol %.

From the viewpoint of thermal stability of the resin composition during melt molding process, the amount of 1,2-glycol bonded to the EVOH (A) is preferably less than 1.8 mol %, more preferably less than 1.5 mol %, further preferably less than 1.0 mol %. The amount of bonded 1,2-glycol is preferably and most easily controlled by the polymerization temperature. For example, the polymerization is conducted preferably at 40° C. to 120° C., more preferably at 50° C. to 100° C. The amount of bonded 1,2-glycol is represented by the ratio of monomer units contributing to the bonding relative to the total amount of monomer units.

Regarding the melt viscosity of the EVOH (A), the lower limit of the melt flow rate (MFR) at 210° C. and 2160-g load is preferably 1.0 g/10 minutes, more preferably 2.0 g/10 minutes, and the upper limit is preferably 100 g/10 minutes, more preferably 60 g/10 minutes. When the EVOH (A) has such melt viscosity, melt moldability of the resin composition can be further enhanced.

Only one type of the EVOH (A) can be used or two or more types thereof can be used as a mixture.

(Hydroxy Group-Containing Compound (B))

The resin composition comprising the EVOH (A) and the hydroxy group-containing compound (B) in the silage film of the present invention fundamentally contains the hydroxy group-containing compound (B). The hydroxy group-containing compound (B) satisfies the following requirements:
 a molecular weight of less than or equal to 200,
 a ratio of number of hydroxy groups per molecule to the molecular weight ranging from 0.02 to 0.03,
 a melting point of greater than or equal to 23° C., and
 a content thereof in the resin composition ranging from 3% to 15% by mass.

When the hydroxy group-containing compound (B) satisfying these requirements is used in combination with the EVOH (A), the resulting silage film can have excellent oxygen barrier property (a low oxygen transmission rate) and excellent stretchability as proven in the examples section below. This phenomenon is probably attributed to the hydroxy group-containing compound (B) with these requirements which acts as a plasticizer for the EVOH (A). A hydroxy group-containing compound is not a typical plasticizer, but probably acts as a plasticizer when used with the EVOH (A) in the following mechanism: a hydroxy group of the hydroxy group-containing compound (B) interacts with a hydroxy group of the EVOH (A), and the hydroxy group-containing compound (B) is inserted itself between the chains of the EVOH (A), thereby resulting in enhanced mobility of the molecular chains of the EVOH (A). Therefore, the compound that acts as a plasticizer for the EVOH (A) needs to contain a hydroxy group.

The hydroxy group-containing compound (B) used in the present invention has a molecular weight of less than or equal to 200 as described above. If a hydroxy group-containing compound having a molecular weight of greater than 200 (such as 1,14-tetradecanediol (molecular weight: 230), 1,16-hexadecanediol (molecular weight: 258), ditrimethylolpropane (molecular weight: 250), dipentaerythritol (molecular weight: 254), or tripentaerythritol (molecular weight: 372)) is used, phase separation is caused due to the poor compatibility with the EVOH (A), and it does not act as a plasticizer. For the hydroxy group-containing compound (B) to be excellently compatible with the EVOH (A) and thereby act as a plasticizer, the lower limit of molecular weight of the hydroxy group-containing compound (B) is preferably 50, more preferably 75, and the upper limit is preferably 180, more preferably 150. The molecular weight of the hydroxy group-containing compound (B) is calculated by adding up mass numbers of all the constituent elements thereof.

The hydroxy group-containing compound (B) used in the present invention has a ratio of number of hydroxy groups per molecule to the molecular weight (or, a ratio of (number of hydroxy groups per molecule)/(molecular weight)) ranging from 0.02 to 0.03 as described above. If a hydroxy group-containing compound having a ratio of (number of hydroxy groups per molecule)/(molecular weight) of less than 0.02 (such as 1,5-pentanediol (ratio of (number of hydroxy groups per molecule)/(molecular weight): 0.019), 1,6-hexanediol (ratio of (number of hydroxy groups per molecule)/(molecular weight): 0.017), or 1,7-heptanediol (ratio of (number of hydroxy groups per molecule)/(molecular weight): 0.015)) is used as the hydroxy group-containing compound (B), the interaction with the EVOH (A) becomes poor and thereby it is not effective enough as a plasticizer. In this case, the resulting resin composition may have a high glass transition temperature and the resulting silage film may have a high tensile modulus of elasticity, which are unfavorable. Being insufficiently compatible with the EVOH (A), the hydroxy group-containing compound may cause poor tensile elongation at break or high oxygen transmission rate (OTR) or a patchy appearance of the resulting silage film, which are also unfavorable. If a hydroxy group-containing compound having a ratio of (number of hydroxy groups per molecule)/(molecular weight) of greater than 0.03 (such as 1,2,3-propanetriol (ratio of (number of hydroxy groups per molecule)/(molecular weight): 0.033) or erythritol (ratio of (number of hydroxy groups per molecule)/(molecular weight): 0.033)) is used, the hydroxy group-containing compound (B) inhibits crystallization of the EVOH (A), and thus the resulting silage film has high oxygen transmission rate. Furthermore, because the resulting silage film becomes highly hygroscopic, the mobility of hydroxy group-containing compound (B) is enhanced in the silage film and that causes unfavorable bleed-out at high humidity. For the resulting silage film to have a low oxygen transmission rate, a low glass transition temperature, and excellent flexibility, the lower limit of the ratio of (number of hydroxy groups per molecule)/(molecular weight) is preferably 0.021, more preferably 0.022, and the upper limit is preferably 0.025, more preferably 0.023.

The hydroxy group-containing compound (B) used in the present invention has a melting point (Tm) of greater than or equal to 23° C. When a hydroxy group-containing compound having a melting point of less than 23° C. (such as 1,2-propylene glycol (melting point: −59° C.), 1,4-propylene glycol (melting point: −27° C.), 1,4-butanediol (melting point: 20° C.), or 1,5-pentanediol (melting point: −18° C.)) is used, the resulting molded article may cause bleed-out, which is unfavorable. A hydroxy group-containing compound with a moderately low melting point is considered to be highly effective in enhancing mobility of the chains of the EVOH (A) when mixed with the EVOH, and therefore the upper limit of the melting point of the hydroxy group-containing compound (B) is preferably 200° C., more preferably 100° C. The melting point of the hydroxy group-containing compound (B) is measured by a method in accordance with JIS K 0064.

The hydroxy group-containing compound (B) used in the present invention has a content thereof in the resin composition ranging from 3% to 15% by mass. When the content of the hydroxy group-containing compound (B) in the resin composition is less than 3% by mass, the hydroxy group-containing compound is not effective enough as a plasticizer, leading to a high glass transition temperature and a high tensile modulus of elasticity of the resulting silage film at room temperature, which are unfavorable. When the content of the hydroxy group-containing compound (B) in the resin composition is greater than 15% by mass, the resulting silage film has a low oxygen transmission rate or may have poor tensile elongation at break, which is also unfavorable. For the hydroxy group-containing compound to be effective enough as a plasticizer, the resulting resin composition to have a low glass transition temperature, and the resulting silage film to have excellent flexibility and to retain a low oxygen transmission rate, the lower limit of the content of the hydroxy group-containing compound (B) in the resin composition is preferably 4% by mass, more preferably 5% by mass, and the upper limit is preferably 10% by mass, more preferably 8% by mass.

Examples of the hydroxy group-containing compound (B) having the molecular weight, the ratio of (number of hydroxy groups per molecule)/(molecular weight), and the melting point described above include 1,1,1-trimethylolpropane, 1,1,1-trimethylolethane, trimethylolmethane, and tetramethylolmethane (pentaerythritol). Among these, 1,1,1-trimethylolpropane and 1,1,1-trimethylolethane are preferable and 1,1,1-trimethylolpropane is particularly preferable to give the resulting molded article a high glass transition temperature and excellent flexibility and to retain a low oxygen transmission rate.

The resin composition comprising the EVOH (A) and the hydroxy group-containing compound (B) in the silage film of the present invention may further contain, in addition to the EVOH (A) and the hydroxy group-containing compound (B), a known additive typically contained in the EVOH (A), such as a heat stabilizer, an antioxidant, an antistatic agent, a colorant, an ultraviolet absorber, a lubricant, a plasticizer, a light stabilizer, a surfactant, an antimicrobial agent, a desiccating agent, an anti-blocking agent, a flame retardant, a crosslinking agent, a curing agent, a foaming agent, a nucleating agent, an anti-fogging agent, an additive to give biodegradability, a silane coupling agent, and an oxygen absorbent, provided that the effects of the present invention are not impaired.

The glass transition temperature (Tg) of the resin composition containing the EVOH (A) and the hydroxy group-containing compound (B) in the silage film of the present invention preferably has a lower limit of 10° C., more preferably 20° C., and preferably has an upper limit of 50° C., more preferably 40° C. When the glass transition temperature of the resin composition is less than 10° C., the oxygen transmission rate of the resulting silage film tends to be high. When the glass transition temperature of the resin composition is greater than 50° C., flexibility of the resulting silage film tends to be poor.

For ease of melt molding, the melting point (Tm) of the resin composition containing the EVOH (A) and the hydroxy group-containing compound (B) in the silage film of the present invention preferably has a lower limit of 100° C., more preferably 120° C., and preferably has an upper limit of 200° C., more preferably 180° C.

<Preparation of Resin Composition>

The resin composition comprising the EVOH (A) and the hydroxy group-containing compound (B) in the silage film of the present invention can be produced by mixing the components by a known method, such as melt mixing, solution mixing, or mechanical mixing, and then molding the obtained mixture by a known method. As an examples of melt mixing, dry blending the components and followed by melt mixing of the obtained blend. A known melt-kneading apparatus such as a kneader/extruder, an extruder, a mixing roll, a Banbury mixer, or a plastomill can be used, and typically and industrially preferably, a single or twin screw extruder is used. When needed, some apparatuses such as a vacuum pump, a gear pump, and/or a screen mesh are preferably equipped. Examples of the technique of solution mixing include a technique involving dissolving and mixing the components in a common good solvent and then allowing precipitation to occur in a common poor solvent. After melt mixing or solution mixing, the resulting resin can be shaped into a powder form, a spherical or cylindrical pellet form, a flaky form, or in other forms for use.

<Silage Film>

The silage film of the present invention having at least one layer of the resin composition containing the EVOH (A) and the hydroxy group-containing compound (B) described above has excellent oxygen barrier property (a low oxygen transmission rate), does not cause bleed-out, and has a low glass transition temperature and excellent flexibility.

The absence of bleed-out can be checked under conditions of 40° C. and 100% RH.

The tensile modulus of elasticity (23° C., 50% RH, MD/TD) of the silage film of the present invention having at least one layer of the resin composition containing the EVOH (A) and the hydroxy group-containing compound (B) described above preferably has a lower limit of 100 MPa, and preferably has an upper limit of 2000 MPa, more preferably 1000 MPa, as measured in accordance with the requirements of JIS K 7161 in terms of a 20-μm monolayer film.

The tensile strength at break (23° C., 50% RH, MD/TD) of the silage film of the present invention having at least one layer of the resin composition containing the EVOH (A) and the hydroxy group-containing compound (B) described above preferably has a lower limit of 20 MPa and an upper limit of 40 MPa as measured in accordance with the requirements of JIS K 7161 in terms of a 100-μm monolayer film.

The tensile elongation at break (23° C., 50% RH, MD/TD) of the silage film of the present invention having at least one layer of the resin composition containing the EVOH (A) and the hydroxy group-containing compound (B) described above preferably has a lower limit of 100% and an upper limit of 500% as measured in accordance with the requirements of JIS K 7161 in terms of a 100-μm monolayer film.

The puncture resistance (23° C., 50% RH) of the silage film of the present invention having at least one layer of the resin composition containing the EVOH (A) and the hydroxy group-containing compound (B) described above preferably has a lower limit of 3 N and an upper limit of 5.0 N as measured in accordance with the requirements of JIS Z 1707 in terms of a 20-μm monolayer film.

The oxygen transmission rate (OTR) (20° C., 85% RH) of the silage film of the present invention having at least one layer of the resin composition containing the EVOH (A) and the hydroxy group-containing compound (B) described above as measured in accordance with the requirements of ISO 14663-2 is preferably as low as possible, and preferably has an upper limit of 50 cc·20 μm/(m²·day·atm), more preferably 30 cc·20 μm/(m²·day·atm).

A resin contained in another constituent layer of the silage film of the present invention, which is not the layer of the resin composition comprising the EVOH (A) and the hydroxy group-containing compound (B), is not particularly limited. In order to avoid moisture which causes worse barrier property of the resin composition comprising the EVOH (A) and the hydroxy group-containing compound (B), the resin contained in another constituent layer is preferably a hydrophobic thermoplastic resin, for example. Specific examples of the hydrophobic thermoplastic resin include polyolefin resins; polyethylenes such as linear low-density polyethylenes, low-density polyethylenes, ultra-low-density polyethylenes, ultra-low-density linear polyethylenes, medium-density polyethylenes, and high-density polyethylenes, polyethylene resins such as ethylene-α-olefin copolymers, polypropylene resins such as polypropylenes, ethylene-propylene (block and random) copolymers, and propylene-α-olefin ($C_{4-20}$ α-olefin) copolymers, polybutenes, and polypentenes; graft polyolefins obtained by graft modification of these polyolefins with an unsaturated carboxylic acid or an ester thereof, and cyclic polyolefin resins; and ionomers, an ethylene-vinyl acetate copolymer, an ethylene-acrylic acid copolymer, ethylene-acrylic acid ester copolymers, polyester resins, polyamide resins, polyvinyl chloride, polyvinylidene chloride, acrylic resins, polystyrenes, vinyl ester resins, polyester elastomers, polyurethane elastomers, halogenated polyolefins such as chlorinated polyethylenes and chlorinated polypropylenes, and aromatic and aliphatic polyketones. In terms of mechanical strength and molding processability, polyolefin resins are preferable, and polyethylenes and polypropylenes are particularly preferable among these.

For the hydrophobic thermoplastic resin, an anti-ultraviolet agent and/or an adhesive component is preferably added. Examples of the anti-ultraviolet agent include an ultraviolet absorber, a light stabilizer, and a colorant.

The content of the anti-ultraviolet agent in the hydrophobic thermoplastic resin is typically from 1% by weight to 10% by weight, preferably from 2% by weight to 8% by weight, particularly preferably from 3% by weight to 5% by weight, in the hydrophobic thermoplastic resin. When the content is less than these ranges, the hydrophobic thermoplastic resin tends to be degraded by ultraviolet light. When the content is greater than these ranges, the hydrophobic thermoplastic resin has poor mechanical strength.

Examples of the adhesive component include aliphatic saturated hydrocarbon resins such as polyisobutenes and alicyclic saturated hydrocarbon resins. The content of the adhesive component in the hydrophobic thermoplastic resin is typically from 1% by weight to 30% by weight, preferably from 2% by weight to 20% by weight, particularly preferably from 3% by weight to 15% by weight. When the content is appropriate, the overlapped portions of the silage film of the present invention are adhered to each other when silage is wrapped, and thus hermetic sealing tends to be maintained. When the content is less than these ranges, gaps are formed between the films to allow air penetration into a silo, impairing long-term storage property of the silage. When the content is greater than these ranges, the resulting silage film causes blocking, that makes it impossible to unwind the film roll.

Regarding the melt viscosity of the hydrophobic thermoplastic resin, the MFR at 210° C. and a 2160-g load preferably has a lower limit of 1.0 g/10 minutes, more preferably 2.0 g/10 minutes, and preferably has an upper limit of 100 g/10 minutes, more preferably 60 g/10 minutes. The difference between the MFR of the hydrophobic thermoplastic resin and the MFR of the resin composition containing the EVOH (A) and the hydroxy group-containing compound (B) is preferably small. When the melt viscosity of the hydrophobic thermoplastic resin is as described above, an excellent silage film without layer turbulence can be obtained.

For adhesion between the layer of the resin composition comprising the EVOH (A) and the hydroxy group-containing compound (B) (resin composition layer) and the layer of the hydrophobic thermoplastic resin (hydrophobic thermoplastic resin layer), an adhesive resin layer is preferably interposed between these layers. An adhesive resin therein is not particularly limited and can be selected from various resins. Typical examples of the adhesive resin include carboxy group-containing modified polyolefin resins obtained by chemically binding an unsaturated carboxylic acid or an anhydride thereof to a polyolefin resin. Specific examples of the adhesive resin include polyethylenes modified with maleic anhydride, polypropylenes modified with maleic anhydride, a maleic anhydride-modified ethylene-ethyl acrylate copolymer, and a maleic anhydride-graft-modified ethylene-vinyl acetate copolymer. In terms of mechanical strength and molding processability, polyethylenes modified with maleic anhydride and polypropylenes modified with maleic anhydride are preferable and polyethylenes modified with maleic anhydride are particularly preferable among these.

Regarding the melt viscosity of the adhesive resin, the MFR at 210° C. and a 2160-g load preferably has a lower limit of 1.0 g/10 minutes, more preferably 2.0 g/10 minutes, and preferably has an upper limit of 100 g/10 minutes, more preferably 60 g/10 minutes. The difference between the MFR of the adhesive resin and the MFR of the resin composition containing the EVOH (A) and the hydroxy group-containing compound (B) is preferably small. When the melt viscosity of the adhesive resin is as described above, an excellent silage film having excellent adhesive strength without any layer turbulence can be obtained.

An example of the layer structure of the silage film is shown below, in which the resin composition layer comprising the EVOH (A) and the hydroxy group-containing compound (B) is represented as F, the hydrophobic thermoplastic resin layer as A, and the adhesive resin layer as MA.

A layer closer to the left end of the layer structure corresponds to a layer arranged closer to the outside (a side that is exposed to the external environment).

Five layers F/MA/A/MA/F, A/MA/F/MA/A, A/MA/F/MA/F

Six layers A/MA/F/MA/A/A

Seven layers A/MA/F/MA/F/MA/A, A/A/MA/F/MA/A/A

For preventing moisture in order to avoid degrading oxygen barrier property, a structure, in which the resin composition layer containing the EVOH (A) and the hydroxy group-containing compound (B) represented as F is used as an intermediate layer and the hydrophobic resin composition layer is used as an outer layer, is preferable. And the structures of A/MA/F/MA/A and A/A/MA/F/MA/A/A are more preferable among these.

Regarding the thickness of the silage film of the present invention, the total thickness thereof is typically from 5 μm to 200 μm preferably from 10 μm to 150 μm, more preferably from 15 μm to 100 μm particularly preferably from 20 μm to 50 μm. The thickness of the hydrophobic resin composition layer in the silage film is not particularly limited, but is typically from 0.5 μm to 200 μm, preferably from 1 μm to 100 μm, particularly preferably from 1 μm to 10 μm. The thickness ratio of the resin composition layer comprising the EVOH (A) and the hydroxy group-containing compound (B) in the total layer thickness is not particularly limited, but desirably ranges from 1% to 20%, preferably from 2% to 18%, more preferably from 3% to 15%, of the total layer thickness.

Methods of producing the silage film are broadly classified into a process involving melting the resin composition and then molding the resultant melt (a melt molding process), and also a process involving dissolving the resin composition in solvent and then molding the resultant solution (such as a solution coating process), for example. From the viewpoint of productivity, the melt molding process is preferable among these. Specific examples thereof include the following: melt extrusion of the hydrophobic thermoplastic resin on a molded article of the resin composition containing the EVOH (A) and the hydroxy group-containing compound (B); melt extrusion to form the resin composition layer on a base material such as the hydrophobic thermoplastic resin; and coextrusion of the resin composition and the hydrophobic thermoplastic resin. More specifically, cast coextrusion or blown coextrusion is adopted.

The form of the silo to which the silage film of the present invention is applied is not particularly limited. Examples of the form include a wrap silo form, a bunker silo form, a bag silo form, a tube silo form, and a stack silo form. A wrap silo form is particularly preferable.

A wrap silo is prepared by shaping grass into a bale of a desired volume using a machine such as a roll baler and then wrapping the shaped bale of grass with the silage film of the present invention using a machine such as a bale wrapper to hermetically seal the silage. The amount of air remaining in the hermetically sealed silo affects the quality of the silage, and therefore it is preferable to make the silage film tightly adhered to the silage by applying tension to the silage film to stretch the film while wrapping.

The present invention also provides wrapped fodder including the silage film of the present invention. The wrapped fodder is an embodiment of silo prepared by shaping fodder by, for example, wrapping the fodder with the silage film of the present invention. The present invention also provides a method of storing fodder using the wrapped fodder of the present invention.

EXAMPLES

The present invention is more specifically described by way of examples. The scope of the present invention, however, is not limited to these examples.

[Ethylene Unit Content in and Saponification Degree of EVOH (A)]

Measurement was conducted by $^1$H-NMR measurement (apparatus: JNM-GX-500 manufactured by JEOL Ltd.) using DMSO-$d_6$ as a solvent.

[Amount of 1,2-glycol Bonded to EVOH (A)]

Measurement was conducted by $^1$H-NMR measurement (apparatus: JNM-GX-500 manufactured by JEOL Ltd.) using DMSO-$d_6$ as a solvent.

[Melt Flow Rate (MFR)]

The discharging rate (g/10 minutes) of a sample was measured by a melt indexer (L244 manufactured by Takarakogyo) under conditions of a temperature at 210° C. and with a load of 2160 g.

[Melting Point (Tm), Glass Transition Temperature (Tg)]

The melting point (Tm) and the glass transition temperature (Tg) were determined in accordance with JIS K 7121 using a differential scanning calorimeter (DSC) (Q2000 manufactured by TA Instruments).

[Conditions for Preparing Resin Composition]

The EVOH (A) and the hydroxy group-containing compound (B) were mixed together and the resulting mixture was subjected to melt kneading, pelletizing, and drying under the following conditions to obtain the resin composition in a pellet form.

Apparatus: 26-mmφ) twin screw extruder (Labo Plastomill 15C300 manufactured by Toyo Seiki Seisaku-sho, Ltd.)

L/D: 25

Screw: co-rotating full-intermeshing type

Number of die holes: 2 holes (3 mmφ)

Extrusion temperature (° C.): C1=200, C2 to C5=230, Die=230

Rotation speed: 100 rpm

Output: about 5 kg/hr

Drying: hot air drying at 80° C. for 6 hr

[Conditions for Preparing Monolayer Film (Molded Article)]

The resulting resin composition was formed into a film under the following conditions. Monolayer films (molded articles) having a thickness of 20 μm and 100 μm were thus obtained.

Apparatus: 20-mmφ) single screw extruder (Labo Plastomill 15C300 manufactured by Toyo Seiki Seisaku-sho, Ltd.)

L/D: 20

Screw: full flight type

Die: 300 mm coat-hanger die

Extrusion temperature (° C.): C1=180, C2 to C3=200, Die=200

Screen: 50/100/50

Temperature of cooling roll: 20° C.

Rotation speed: (during formation of 20 μm thick film) 40 rpm, (during formation of 100 μm thick film) 100 rpm Haul-off speed: (during formation of 20 μm thick film) 3.0 m/minute to 3.5 m/minute, (during formation of 100 μm thick film) 1.5 m/minute to 1.75 m/minute

[Tensile Modulus of Elasticity]

In accordance with JIS K 7161, the resulting 20 µm monolayer film was subjected to humidity conditioning under conditions of 23° C./50% RH; cut into a strip having a width of 15 mm and a length of 12 cm; and subjected to measurement with AUTOGRAPH AGS-H (manufactured by Shimadzu Corporation) in MD and TD at a chuck-to-chuck distance of 50 mm and a tensile speed of 5 mm/minute. The resulting values were used as indexes of flexibility.

[Tensile Strength at Break, Tensile Elongation at Break]

In accordance with JIS K 7161, the resulting 100 µm monolayer film was subjected to humidity conditioning under conditions of 23° C./50% RH; cut into a strip having a width of 15 mm and a length of 12 cm; and subjected to measurement with AUTOGRAPH AGS-H (manufactured by Shimadzu Corporation) in MD and TD at a chuck-to-chuck distance of 50 mm and a tensile speed of 500 mm/minute.

[Puncture Resistance]

In accordance with JIS Z 1707, the resulting 20 µm monolayer film was subjected to humidity conditioning under conditions of 23° C./50% RH; cut into a circular test piece having a diameter of 10 cm; immobilized by means of a jig; and on AUTOGRAPH AGS-H (manufactured by Shimadzu Corporation), punctured with a needle having a semicircular cross section with a diameter of 1.0 mm and a tip radius of 0.5 mm at a rate of 50 mm/minute. The maximum stress within the time period until the needle passed through the film was thus obtained.

[Oxygen Transmission Rate (OTR)]

The resulting 20 µm monolayer film was subjected to humidity conditioning under conditions of 20° C./85% RH and then in accordance with ISO14663-2, subjected to measurement of the oxygen transmission rate (OTR) on an oxygen transmission rate meter (OX-Tran 2/20 manufactured by Modern Control) under conditions of 20° C./85% RH.

[Bleed Out]

The resulting 20 µm monolayer film was stored under conditions of 40° C./100% RH for seven days, followed by visual examination and measurement of infrared absorption spectra by Fourier transform infrared spectroscopy (Spectrum One manufactured by Perkin Elmer) with ATR (attenuated total reflection) mode. The presence or absence of bleed-out of the hydroxy group-containing compound (B) was checked and rated as either the following X or Y.

X: No bleed-out observed.

Y: Bleed-out observed.

[Conditions for Preparing Silage Film]

The resulting resin composition was formed into a film under the following conditions, followed by trimming into a silage film having a width of 500 mm and an entire thickness of 25.5 µm.

Apparatus: a 7-kind 7-layer blown film extruder (manufactured by Brampton Engineering)

(Layer Structure and Thickness of Each Layer)

4-kind 7-layer (outer layer 1/outer layer 2/adhesive resin layer 1/resin composition layer/adhesive resin layer 2/outer layer 3/outer layer 4)

Outer layers 1 and 4: a melt-kneaded product of 97% by weight of a linear low-density polyethylene (TUFLIN HS-7028 NT7 manufactured by Dow Chemical Company (MFR 1.0 g/10 minutes)) and 3% by weight of a polyisobutene (PB32 manufactured by Soltex), 6 µm Outer layers 2 and 3: a melt-kneaded product of 90% by weight of a linear low-density polyethylene (TUFLIN HS-7028 NT7 manufactured by Dow Chemical Company (MFR 1.0 g/10 minutes)) and 10% by weight of a polyisobutene (PB32 manufactured by Soltex), 4 µm Adhesive resin layers 1 and 2: a linear low-density polyethylene modified with maleic anhydride (Admer NF498 manufactured by Mitsui Chemicals, Inc.), 2.0 µm Resin composition layer: a resin composition described in an example and a comparative example, 1.5 µm

[Conditions for Film Formation]

Extruder

Outer layer 1: 45-mmφ single screw extruder (L/D=24)

Outer layer 2: 30-mmφ single screw extruder (L/D=24)

Outer layer 3: 30-mmφ single screw extruder (L/D=24)

Outer layer 4: 45-mmφ single screw extruder (L/D=24)

Adhesive resin layer 1: 30-mmφ single screw extruder (L/D=24)

Adhesive resin layer 2: 30-mmφ single screw extruder (L/D=24)

Resin composition layer: 30-mmφ single screw extruder (L/D=20) Temperature setting and rotational speed:

Outer layers 1 and 4: C1/C2/C3/A=180° C./190° C./205° C./205° C., 27 rpm

Outer layers 2 and 3: C1/C2/C3/A=180° C./190° C./205° C./205° C., 69 rpm

Adhesive resin layers 1 and 2: C1/C2/C3/A=190° C./225° C./215° C./220° C., 26 rpm Resin composition layer: C1/C2/C3/A=180° C./210° C./215° C./220° C. (C1/C2/C3/A=200° C./230° C./230° C./230° C. when the resin composition layer was polyamide 6), 19 rpm Die: 150 mm, temperature set at 220° C.

Film haul-off speed: 24 m/minute

[Wrapping Test]

A bale of grass shaped into a size of φ 120 cm×120 cm was wrapped five times by means of a remote control wrapper WM1600R (manufactured by Takakita Co., Ltd.). Stretchability (suitability for wrapping) was evaluated by frequency of film breakage.

Example 1

A mixture of 90% by mass of an EVOH resin (also called "A1") manufactured by KURARAY CO., LTD. having an ethylene unit rate of 44 mol %, a saponification degree of greater than or equal to 99 mol %, an MFR of 5.7 g/10 minutes (210° C., 2160-g load), and an amount of 1,2-glycol bond of 0.46 mol % and 10% by mass of 1,1,1-trimethylolpropane (also called "TMP") (molecular weight of 134, number of hydroxy groups of 3, ratio of (number of hydroxy groups per molecule)/(molecular weight) of 0.022, melting point of 58° C.) as a hydroxy group-containing compound was subjected to melt kneading and pelletizing by the above-described method using a twin screw extruder, followed by drying in a hot-air dryer at 80° C. for 6 hr to obtain a resin composition. The resulting resin composition was formed into 20 µm and 100 monolayer films by the above-described method using a single screw extruder, and was also formed into a silage film by the above-described method with a blown multilayer-film extruder. The glass transition temperature of the resulting resin composition was measured by the above-described method. Also by the above-described methods, each of the resulting monolayer films was subjected to measurement of the tensile modulus of elasticity, tensile strength at break, tensile elongation at break, puncture resistance, oxygen transmission rate (OTR), and the presence or absence of bleed-out, and the resulting silage film was evaluated for stretchability (suitability for wrapping). The results are shown in Table 1.

Example 2

A resin composition, monolayer films, and a silage film were obtained in the same manner as in Example 1 except that A1 was replaced by an EVOH resin (also called "A2") manufactured by KURARAY CO., LTD. having an ethylene unit rate of 32 mol %, a saponification degree of greater than or equal to 99 mol %, an MFR of 4.4 g/10 minutes (210° C., 2160-g load), and an amount of 1,2-glycol bond of 0.73 mol %. The resulting resin composition, monolayer films, and silage film were evaluated in the same manner as in Example 1. The results are shown in Table 1.

Example 3

A resin composition, monolayer films, and a silage film were obtained in the same manner as in Example 1 except that 85% by mass of the EVOH resin and 15% by mass of the hydroxy group-containing compound were mixed together. The resulting resin composition, monolayer films, and silage film were evaluated in the same manner as in Example 1. The results are shown in Table 1.

Example 4

A resin composition, monolayer films, and a silage film were obtained in the same manner as in Example 1 except that 93% by mass of the EVOH resin and 7% by mass of the hydroxy group-containing compound were mixed together. The resulting resin composition, monolayer films, and silage film were evaluated in the same manner as in Example 1. The results are shown in Table 1.

Example 5

A resin composition, monolayer films, and a silage film were obtained in the same manner as in Example 1 except that 97% by mass of the EVOH resin and 3% by mass of the hydroxy group-containing compound were mixed together. The resulting resin composition, monolayer films, and silage film were evaluated in the same manner as in Example 1. The results are shown in Table 1.

Example 6

A resin composition, monolayer films, and a silage film were obtained in the same manner as in Example 1 except that TMP as a hydroxy group-containing compound was replaced by 1,1,1-trimethylolethane (also called "TME") (molecular weight of 120, number of hydroxy groups of 3, ratio of (number of hydroxy groups per molecule)/(molecular weight) of 0.025, melting point of 193° C.). The resulting resin composition, monolayer films, and silage film were evaluated in the same manner as in Example 1. The results are shown in Table 1.

Example 7

A resin composition, monolayer films, and a silage film were obtained in the same manner as in Example 1 except that TMP as a hydroxy group-containing compound was replaced by tetramethylolmethane (pentaerythritol) (also called "TeMM") (molecular weight of 136, number of hydroxy groups of 4, ratio of (number of hydroxy groups per molecule)/(molecular weight) of 0.029, melting point of 261° C.). The resulting resin composition, monolayer films, and silage film were evaluated in the same manner as in Example 1. The results are shown in Table 1.

Example 8

A resin composition and a molded article were obtained in the same manner as in Example 1 except that A1 was replaced by an EVOH resin (also called "A3") manufactured by KURARAY CO., LTD. having an ethylene rate of 44 mol %, a saponification degree of greater than or equal to 99 mol %, an MFR of 3.3 g/10 minutes (210° C., 2160-g load), and an amount of 1,2-glycol bond of 0.49 mol %. The resulting resin composition and molded article were evaluated in the same manner as in Example 1. The results are shown in Table 2.

Example 9

A resin composition and a molded article were obtained in the same manner as in Example 1 except that A1 was replaced by an EVOH resin (also called "A4") manufactured by KURARAY CO., LTD. having an ethylene rate of 32 mol %, a saponification degree of greater than or equal to 99 mol %, an MFR of 3.7 g/10 minutes (210° C., 2160-g load), and an amount of 1,2-glycol bond of 0.71 mol %. The resulting resin composition and molded article were evaluated in the same manner as in Example 1. The results are shown in Table 2.

Example 10

A resin composition and a molded article were obtained in the same manner as in Example 8 except that 85% by mass of the EVOH resin and 15% by mass of the hydroxy group-containing compound were mixed together. The resulting resin composition and molded article were evaluated in the same manner as in Example 1. The results are shown in Table 2.

Example 11

A resin composition and a molded article were obtained in the same manner as in Example 8 except that 93% by mass of the EVOH resin and 7% by mass of the hydroxy group-containing compound were mixed together. The resulting resin composition and molded article were evaluated in the same manner as in Example 1.
The results are shown in Table 2.

Example 12

A resin composition and a molded article were obtained in the same manner as in Example 8 except that 97% by mass of the EVOH resin and 3% by mass of the hydroxy group-containing compound were mixed together. The resulting resin composition and molded article were evaluated in the same manner as in Example 1. The results are shown in Table 2.

Example 13

A resin composition and a molded article were obtained in the same manner as in Example 8 except that TMP as a hydroxy group-containing compound was replaced by TME.

The resulting resin composition and molded article were evaluated in the same manner as in Example 1. The results are shown in Table 2.

Example 14

A resin composition and a molded article were obtained in the same manner as in Example 8 except that TMP as a hydroxy group-containing compound was replaced by TeMM. The resulting resin composition and molded article were evaluated in the same manner as in Example 1. The results are shown in Table 2.

Comparative Example 1

A resin composition, monolayer films, and a silage film were obtained in the same manner as in Example 1 except that no hydroxy group-containing compound was used. The resulting resin composition, monolayer films, and silage film were evaluated in the same manner as in Example 1. The results are shown in Table 3.

Comparative Example 2

A resin composition, monolayer films, and a silage film were obtained in the same manner as in Example 2 except that no hydroxy group-containing compound was used. The resulting resin composition, monolayer films, and silage film were evaluated in the same manner as in Example 1. The results are shown in Table 3.

Comparative Example 3

A resin composition, monolayer films, and a silage film were obtained in the same manner as in Example 1 except that 80% by mass of the EVOH resin and 20% by mass of the hydroxy group-containing compound were mixed together. The resulting resin composition, monolayer films, and silage film were evaluated in the same manner as in Example 1. The results are shown in Table 3.

Comparative Example 4

A resin composition, monolayer films, and a silage film were obtained in the same manner as in Example 1 except that 98% by mass of the EVOH resin and 2% by mass of the hydroxy group-containing compound were mixed together. The resulting resin composition, monolayer films, and silage film were evaluated in the same manner as in Example 1. The results are shown in Table 3.

Comparative Example 5

A resin composition, monolayer films, and a silage film were obtained in the same manner as in Example 1 except that TMP as a hydroxy group-containing compound was replaced by propylene glycol (also called "PPG") (molecular weight of 76, number of hydroxy groups of 2, ratio of (number of hydroxy groups per molecule)/(molecular weight) of 0.026, melting point of −59° C.). The resulting resin composition, monolayer films, and silage film were evaluated in the same manner as in Example 1. The results are shown in Table 3. The resulting resin composition had bleed-out of the hydroxy group-containing compound and did not successfully adhere to adhesive resin layer. Therefore, no wrapping test was conducted.

Comparative Example 6

A resin composition, monolayer films, and a silage film were obtained in the same manner as in Example 1 except that TMP as a hydroxy group-containing compound was replaced by 1,5-pentanediol (also called "PeDO") (molecular weight of 104, number of hydroxy groups of 2, ratio of (number of hydroxy groups per molecule)/(molecular weight) of 0.019, melting point of −18° C.). The resulting resin composition, monolayer films, and silage film were evaluated in the same manner as in Example 1. The results are shown in Table 3. The resulting resin composition had bleed-out of the hydroxy group-containing compound and did not successfully adhere to adhesive resin layer. Therefore, no wrapping test was conducted.

Comparative Example 7

A resin composition, monolayer films, and a silage film were obtained in the same manner as in Example 1 except that TMP as a hydroxy group-containing compound was replaced by 1,6-hexanediol (also called "HDO") (molecular weight of 118, number of hydroxy groups of 2, ratio of (number of hydroxy groups per molecule)/(molecular weight) of 0.017, melting point of 42° C.). The resulting resin composition, monolayer films, and silage film were evaluated in the same manner as in Example 1. The results are shown in Table 3. The resulting resin composition had bleed-out of the hydroxy group-containing compound and did not successfully adhere to adhesive resin layer. Therefore, no wrapping test was conducted.

Comparative Example 8

A resin composition, monolayer films, and a silage film were obtained in the same manner as in Example 1 except that TMP as a hydroxy group-containing compound was replaced by 1,2,3-propanetriol (also called "PrTO") (molecular weight of 92, number of hydroxy groups of 3, ratio of (number of hydroxy groups per molecule)/(molecular weight) of 0.033, melting point of 18° C.). The resulting resin composition, monolayer films, and silage film were evaluated in the same manner as in Example 1. The results are shown in Table 3. The resulting resin composition had bleed-out of the hydroxy group-containing compound and did not successfully adhere to adhesive resin layer. Therefore, no wrapping test was conducted.

Comparative Example 9

A resin composition and a molded article were obtained in the same manner as in Example 1 except that TMP as a hydroxy group-containing compound was replaced by 1,4-butanediol (also called "BDO") (molecular weight of 90, number of hydroxy groups of 2, ratio of (number of hydroxy groups per molecule)/(molecular weight) of 0.022, melting point of 20° C.). The resulting resin composition and molded article were evaluated in the same manner as in Example 1. The results are shown in Table 3. The resulting resin composition had bleed-out of the hydroxy group-containing compound and did not successfully adhere to adhesive resin layer. Therefore, no wrapping test was conducted.

Comparative Example 10

Monolayer films and a silage film were obtained in the same manner as in Example 1 except that a linear low-density polyethylene (also called "LLDPE") (TUFLIN HS-7028 NT7 manufactured by The Dow Chemical Company (MFR, 1.0 g/10 minutes)) was used instead of the resulting resin composition. By the above-described methods, the oxygen transmission rate (OTR) of each of the resulting monolayer films was measured and stretchability (suitability for wrapping) of the resulting silage film was evaluated. The results are shown in Table 3.

Comparative Example 11

Monolayer films and a silage film were obtained in the same manner as in Example 1 except that polyamide 6 (also called "PA6") (UBE nylon 7024B manufactured by Ube Industries, Ltd.) was used instead of the resulting resin composition. By the above-described methods, the oxygen transmission rate (OTR) of each of the resulting monolayer films was measured and stretchability (suitability for wrapping) of the resulting silage film was evaluated. The results are shown in Table 3.

TABLE 1

|  |  | Example 1 | Example 2 | Example 3 | Example 4 | Example 5 | Example 6 | Example 7 |
|---|---|---|---|---|---|---|---|---|
| Resin type (EVOH (A) type) |  | A1 | A2 | A1 | A1 | A1 | A1 | A1 |
| Hydroxy group-containing low-molecular compound (B) | Type | TMP | TMP | TMP | TMP | TMP | TME | TeMM |
|  | Molecular weight | 134 | 134 | 134 | 134 | 134 | 120 | 136 |
|  | Number of hydroxy groups | 3 | 3 | 3 | 3 | 3 | 3 | 4 |
|  | Ratio of (number of hydroxy groups per molecule)/(molecular weight) | 0.022 | 0.022 | 0.022 | 0.022 | 0.022 | 0.025 | 0.029 |
|  | Melting point (° C.) | 58 | 58 | 58 | 58 | 58 | 193 | 261 |
| A/B | (% by mass/% by mass) | 90/10 | 90/10 | 85/15 | 93/7 | 97/3 | 90/10 | 90/10 |
| Glass transition temperature (Tg) | (° C.) | 21 | 27 | 19 | 29 | 37 | 16 | 18 |
| Melting point (Tm) | (° C.) | 152 | 165 | 151 | 156 | 158 | 150 | 149 |
| Tensile modulus of elasticity 23° C./50% RH | MD (MPa) | 330 | 900 | 250 | 500 | 800 | 240 | 210 |
|  | TD (MPa) | 410 | 800 | 300 | 540 | 840 | 290 | 270 |
| Tensile strength at break 23° C./50% RH | MD (MPa) | 30 | 30 | 25 | 25 | 30 | 30 | 25 |
|  | TD (MPa) | 25 | 30 | 25 | 30 | 25 | 25 | 30 |
| Tensile elongation at break 23° C./50% RH | MD (%) | 400 | 340 | 400 | 360 | 340 | 400 | 410 |
|  | TD (%) | 380 | 330 | 390 | 340 | 320 | 380 | 390 |
| Puncture resistance 23° C./50% RH | (N) | 4.1 | 3.8 | 3.9 | 4.2 | 4.8 | 3.9 | 3.9 |
| OTR 20° C./85% RH | (cc · 20 μm/(m² · day · atm)) | 13.2 | 3.1 | 21.2 | 9.9 | 6.8 | 22.1 | 24.2 |
| Bleed-out 40° C./100% RH |  | X | X | X | X | X | X | X |
| Wrapping test | Frequency of breakage (times) | 0 | 0 | 0 | 0 | 0 | 0 | 0 |

TABLE 2

|  |  | Example 8 | Example 9 | Example 10 | Example 11 | Example 12 | Example 13 | Example 14 |
|---|---|---|---|---|---|---|---|---|
| Resin type (EVOH (A) type) |  | A3 | A4 | A3 | A3 | A3 | A3 | A3 |
| Hydroxy group-containing low-molecular compound (B) | Type | TMP | TMP | TMP | TMP | TMP | TME | TeMM |
|  | Molecular weight | 134 | 134 | 134 | 134 | 134 | 120 | 136 |
|  | Number of hydroxy groups | 3 | 3 | 3 | 3 | 3 | 3 | 4 |
|  | Ratio of (number of hydroxy groups per molecule)/(molecular weight) | 0.022 | 0.022 | 0.022 | 0.022 | 0.022 | 0.025 | 0.029 |
|  | Melting point (° C.) | 58 | 58 | 58 | 58 | 58 | 193 | 261 |
| A/B | (% by mass/% by mass) | 90/10 | 90/10 | 85/15 | 93/7 | 97/3 | 90/10 | 90/10 |
| Glass transition temperature (Tg) | (° C.) | 20 | 28 | 20 | 28 | 38 | 17 | 18 |
| Melting point (Tm) | (° C.) | 151 | 166 | 150 | 155 | 158 | 149 | 147 |
| Tensile modulus of elasticity 23° C./50% RH | MD (MPa) | 340 | 910 | 260 | 510 | 790 | 230 | 200 |
|  | TD (MPa) | 400 | 790 | 300 | 530 | 850 | 280 | 260 |
| Tensile strength at break 23° C./50% RH | MD (MPa) | 30 | 30 | 25 | 25 | 30 | 30 | 25 |
|  | TD (MPa) | 25 | 25 | 25 | 30 | 30 | 25 | 30 |

TABLE 2-continued

|  |  | Example 8 | Example 9 | Example 10 | Example 11 | Example 12 | Example 13 | Example 14 |
|---|---|---|---|---|---|---|---|---|
| Tensile elongation at break 23° C./50% RH | MD (%) | 410 | 350 | 410 | 360 | 350 | 410 | 400 |
|  | TD (%) | 370 | 330 | 380 | 340 | 320 | 380 | 380 |
| Puncture resistance 23° C./50% RH | (N) | 4.0 | 3.7 | 3.9 | 4.3 | 4.7 | 3.8 | 3.9 |
| OTR 20° C./85% RH | (cc · 20 μm/ (m² · day · atm)) | 13.0 | 2.9 | 21.4 | 9.6 | 6.4 | 22.0 | 23.9 |
| Bleed-out 40° C./100% RH |  | X | X | X | X | X | X | X |
| Wrapping test | Frequency of breakage (times) | 0 | 0 | 0 | 0 | 0 | 0 | 0 |

TABLE 3

|  |  | Comparative Example 1 | Comparative Example 2 | Comparative Example 3 | Comparative Example 4 | Comparative Example 5 | Comparative Example 6 |
|---|---|---|---|---|---|---|---|
|  | Resin type | A1 | A2 | A1 | A1 | A1 | A1 |
| Hydroxy group-containing low-molecular compound (B) | Type | — | — | TMP | TMP | PPG | PeDO |
|  | Molecular weight | — | — | 134 | 134 | 76 | 104 |
|  | Number of hydroxy groups | — | — | 3 | 3 | 2 | 2 |
|  | Ratio of (number of hydroxy groups per molecule)/(molecular weight) | — | — | 0.022 | 0.022 | 0.026 | 0.019 |
|  | Melting point (° C.) | — | — | 58 | 58 | −59 | −18 |
| A/B | (% by mass/% by mass) | — | — | 80/20 | 98/2 | 90/10 | 90/10 |
| Glass transition temperature (Tg) | (° C.) | 52 | 57 | 19 | 41 | 20 | 48 |
| Melting point (Tm) | (° C.) | 165 | 183 | 151 | 159 | 150 | 160 |
| Tensile modulus of elasticity 23° C./50% RH | MD (MPa) | 1200 | 2100 | 220 | 1000 | 300 | 560 |
|  | TD (MPa) | 1100 | 1700 | 280 | 900 | 420 | 600 |
| Tensile strength at break 23° C./50% RH | MD (MPa) | 35 | 40 | 25 | 30 | 30 | 35 |
|  | TD (MPa) | 25 | 35 | 25 | 30 | 25 | 25 |
| Tensile elongation at break 23° C./50% RH | MD (%) | 250 | 40 | 400 | 290 | 410 | 340 |
|  | TD (%) | 290 | 40 | 280 | 300 | 400 | 280 |
| Puncture resistance 23° C./50% RH | (N) | 4.9 | 4.4 | 3.6 | 4.8 | 4.1 | 3.4 |
| OTR 20° C./85% RH | (cc · 20 μm/ (m² · day · atm)) | 5.1 | 1.9 | 34.2 | 6.2 | 21.1 | 49.2 |
| Bleed-out 40° C./100% RH |  | — | — | X | X | Y | Y |
| Wrapping test | Frequency of breakage (times) | 5 | 5 | 0 | 2 | — | — |

|  |  | Comparative Example 7 | Comparative Example 8 | Comparative Example 9 | Comparative Example 10 | Comparative Example 11 |
|---|---|---|---|---|---|---|
|  | Resin type | A1 | A1 | A1 | LLDPE | PA6 |
| Hydroxy group-containing low-molecular compound (B) | Type | HDO | PrTO | BDO | — | — |
|  | Molecular weight | 118 | 92 | 90 | — | — |
|  | Number of hydroxy groups | 2 | 3 | 2 | — | — |
|  | Ratio of (number of hydroxy groups per molecule)/(molecular weight) | 0.017 | 0.033 | 0.022 | — | — |
|  | Melting point (° C.) | 42 | 18 | 20 | — | — |
| A/B | (% by mass/% by mass) | 90/10 | 90/10 | 90/10 | — | — |
| Glass transition temperature (Tg) | (° C.) | 45 | 14 | 36 | — | — |
| Melting point (Tm) | (° C.) | 162 | 160 | 155 | — | — |
| Tensile modulus of elasticity 23° C./50% RH | MD (MPa) | 600 | 210 | 480 | — | — |
|  | TD (MPa) | 820 | 260 | 500 | — | — |
| Tensile strength at break 23° C./50% RH | MD (MPa) | 35 | 30 | 35 | — | — |
|  | TD (MPa) | 25 | 25 | 25 | — | — |
| Tensile elongation at break 23° C./50% RH | MD (%) | 350 | 410 | 360 | — | — |
|  | TD (%) | 210 | 420 | 320 | — | — |

TABLE 3-continued

| | | | | | | |
|---|---|---|---|---|---|---|
| Puncture resistance 23° C./50% RH | (N) | 3.2 | 3.8 | 3.7 | — | — |
| OTR 20° C./85% RH | (cc · 20 μm/ (m² · day · atm)) | 21.7 | 33.2 | 30.2 | 200< | 67.5 |
| Bleed-out 40° C./100% RH | | Y | Y | Y | Y | Y |
| Wrapping test | Frequency of breakage (times) | — | — | — | 0 | 0 |

All the embodiments and examples disclosed herein are provided merely for illustrative purposes and are not limitative in all respects. The scope of the present invention is defined not by the description above but by the claims. All the modifications equivalent to the claims and within the range of definition made by the claims are encompassed by the scope of the present invention.

The invention claimed is:

1. A silage film, comprising:
at least one layer of a resin composition consisting essentially of an ethylene-vinyl alcohol copolymer (A) and a hydroxy group-containing compound (B),
wherein said hydroxy group-containing compound (B) has a molecular weight less than or equal to 200, and a ratio of number of hydroxy groups per molecule to the molecular weight ranging from 0.02 to 0.03, and a melting point ranging from 23° C. to 200° C., wherein a content of the hydroxy group-containing compound (B) in the resin composition ranges from 3% to 15% by mass, and
wherein said ethylene-vinyl alcohol copolymer (A) has an ethylene content ranging from 20 mol % to 60 mol %.

2. The silage film according to claim 1, wherein the melting point of said hydroxy group-containing compound (B) ranges from 23° C. to 100° C.

3. The silage film according to claim 1, wherein said hydroxy group-containing compound (B) has a ratio of number of hydroxy groups per molecule to the molecular weight ranging from 0.022 to 0.025.

4. The silage film according to claim 1, wherein said hydroxy group-containing compound (B) is 1,1,1-trimethylolpropane.

5. The silage film according to claim 1, wherein the content of said hydroxy group-containing compound (B) in said resin composition ranges from 5% to 10% by mass.

6. The silage film according to claim 1, wherein said ethylene-vinyl alcohol copolymer (A) has an ethylene content ranging from 25 mol % to 55 mol %.

7. The silage film according to claim 1, wherein a total layer thickness of the silage film ranges from 5 μm to 200 μm and a thickness ratio of the layer of said resin composition in the total layer thickness ranges from 1% to 20%.

8. The silage film according to claim 1, further comprising a polyolefin resin layer on at least one side of the layer of said resin composition.

9. The silage film according to claim 1, wherein the layer of said resin composition is an intermediate layer.

10. A wrapped fodder comprising the silage film according to claim 1.

11. A storage method, comprising storing fodder with the wrapped fodder according to claim 10.

12. The silage film according to claim 1, wherein said ethylene-vinyl alcohol copolymer (A) has an ethylene content ranging from 40 mol % to 50 mol %.

13. The silage film according to claim 1, wherein the content of said hydroxy group-containing compound (B) in said resin composition ranges from 5% to 8% by mass.

14. The silage film according to claim 1, wherein said ethylene-vinyl alcohol copolymer (A) has a saponification degree of greater than or equal to 90 mol %.

15. The silage film according to claim 1, wherein said ethylene-vinyl alcohol copolymer (A) has a saponification degree of greater than or equal to 95 mol %.

16. The silage film according to claim 1, wherein said ethylene-vinyl alcohol copolymer (A) has a 1,2-glycol bonded amount of less than 1.5 mol %.

17. The silage film according to claim 1, wherein said ethylene-vinyl alcohol copolymer (A) has a 1,2-glycol bonded amount of less than 1.0 mol %.

18. The silage film according to claim 1, wherein the resin composition consists of the ethylene-vinyl alcohol copolymer (A), the hydroxy group-containing compound (B), and optionally at least one additive selected from the group consisting of a heat stabilizer, an antioxidant, an antistatic agent, a colorant, an ultraviolet absorber, a lubricant, a plasticizer, a light stabilizer, a surfactant, an antimicrobial agent, a desiccating agent, an anti-blocking agent, a flame retardant, a crosslinking agent, a curing agent, a foaming agent, a nucleating agent, an anti-fogging agent, a silane coupling agent, and an oxygen absorbent.

19. A silage film, comprising:
at least one layer of a resin composition comprising from an ethylene-vinyl alcohol copolymer (A) and a hydroxy group-containing compound (B),
wherein said hydroxy group-containing compound (B) has a molecular weight less than or equal to 200, and a ratio of number of hydroxy groups per molecule to the molecular weight ranging from 0.02 to 0.03, and a melting point of greater than or equal to 23° C.,
wherein a content of the ethylene-vinyl alcohol copolymer (A) in the resin composition ranges from 85% to 97% by mass,
wherein a content of the hydroxy group-containing compound (B) in the resin composition ranges from 3% to 15% by mass, and
wherein said ethylene-vinyl alcohol copolymer (A) has an ethylene content ranging from 20 mol % to 60 mol %.

* * * * *